(12) United States Patent
Karlsson et al.

(10) Patent No.: US 8,635,428 B2
(45) Date of Patent: Jan. 21, 2014

(54) PREVENTING DUPLICATE ENTRIES IN A NON-BLOCKING TLB STRUCTURE THAT SUPPORTS MULTIPLE PAGE SIZES

(75) Inventors: Martin R. Karlsson, San Francisco, CA (US); Jing-Ming Chang, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 583 days.

(21) Appl. No.: 12/633,930

(22) Filed: Dec. 9, 2009

(65) Prior Publication Data
US 2011/0138149 A1 Jun. 9, 2011

(51) Int. Cl.
*G06F 12/00* (2006.01)
(52) U.S. Cl.
USPC ............ 711/205; 711/118; 711/125; 711/133
(58) Field of Classification Search
USPC .................................. 711/118, 125, 133, 205
See application file for complete search history.

(56) References Cited

U.S. PATENT DOCUMENTS

| 7,434,000 | B1* | 10/2008 | Barreh et al. ................. 711/118 |
| 7,562,205 | B1* | 7/2009 | Case et al. .................... 711/209 |
| 2005/0138472 | A1* | 6/2005 | Chheda et al. ................. 714/25 |
| 2007/0186074 | A1* | 8/2007 | Bradford et al. .............. 711/202 |

* cited by examiner

*Primary Examiner* — Reginald Bragdon
*Assistant Examiner* — Gurtej Bansal
(74) *Attorney, Agent, or Firm* — Park, Vaughan, Fleming & Dowler LLP; Mark Spiller (57) ABSTRACT

One embodiment provides a system that prevents duplicate entries in a non-blocking TLB that supports multiple page sizes and speculative execution. During operation, after a request for translation of a virtual address misses in the non-blocking TLB, the system receives a TLB fill. Next, the system determines a page size associated with the TLB fill, and uses this page size to determine a set of bits in the virtual address that identify the virtual page associated with the TLB fill. The system then compares this set of bits with the corresponding bits of other virtual addresses associated with pending translation requests. If the system detects that a second virtual address for another pending translation request is also satisfied by the TLB fill, the system invalidates the duplicate translation request associated with the second virtual address.

20 Claims, 6 Drawing Sheets

PREVENTING DUPLICATE ENTRIES IN A NON-BLOCKING TLB STRUCTURE THAT SUPPORTS MULTIPLE PAGE SIZES

BACKGROUND

1. Field

This disclosure generally relates to the design of a translation lookaside buffer (TLB) in a computer system. More specifically, this disclosure relates to preventing duplicate entries in a non-blocking TLB that supports both multiple page sizes and speculative execution.

2. Related Art

Computer memory is typically divided into a set of fixed-length blocks called "pages." An operating system can provide a virtual memory abstraction to give a program which is accessing such pages the impression that it is accessing a contiguous address space that is larger than the actual available physical memory of the underlying computer system. During operation, the operating system and hardware of the computing device translate virtual addresses accessed by the program into physical addresses in the physical memory.

Accessing a virtual address typically involves using specialized translation hardware to determine a corresponding physical memory address. This translation hardware often includes a translation lookaside buffer (TLB) which caches page table translation information to improve the speed of virtual address translations. In processor architectures that support two or more page sizes, this TLB may cache entries for multiple page sizes. However, problems can arise for processors that support multiple page sizes when the TLB does not know in advance the page size for a given translation request. In some instances, the TLB may become filled with multiple copies of the same translation information, which can cause costly multi-hit traps or pipe clears that lead to TLB invalidations and degrade processor performance.

Hence, what is needed are system structures and techniques for managing virtual address translation without the above-described problems of existing techniques.

SUMMARY

One embodiment provides a system that prevents duplicate entries in a non-blocking TLB that supports multiple page sizes and speculative execution. During operation, after a request for translation of a virtual address misses in the non-blocking TLB, the system receives a TLB fill. Next, the system determines a page size associated with the TLB fill, and uses this page size to determine a set of bits in the virtual address that identify the virtual page associated with the TLB fill. The system then compares this set of bits with the corresponding bits of other virtual addresses associated with pending translation requests. If the system detects that a second virtual address for another pending translation request is also satisfied by the TLB fill, the system invalidates the duplicate translation request associated with the second virtual address.

In some embodiments, the non-blocking TLB uses one or more miss status holding registers (MSHRs) to track TLB fill requests for address translation misses. During speculative operation, the system can invalidate a duplicate translation request by flagging an MSHR associated with the duplicate translation request. The system then discards a subsequently received TLB fill that is associated with the flagged MSHR.

In some embodiments, preventing duplicate entries in the non-blocking TLB eliminates hardware and/or software overhead associated with resolving duplicate hits in the non-blocking TLB. Furthermore, preventing duplicate entries increases the efficiency of the non-blocking TLB by increasing the number of unique page translations that can be cached in the non-blocking TLB.

In some embodiments, increasing the efficiency of a first-level non-blocking TLB reduces bandwidth pressure on a next-level TLB that supports the first-level non-blocking TLB.

In some embodiments, the system predicts a page size for a translation request. Based on this predicted page size, the system predicts that the expected TLB fill is likely to also provide a translation for a second potential translation request. In this way, the system prevents the first-level non-blocking TLB from sending the second potential translation request to the next-level TLB, thereby reducing the request traffic sent to the next-level TLB and reducing TLB fill latency.

In some embodiments, the first-level non-blocking TLB is local to one or more processor cores in a multiprocessor system, and the next-level TLB is shared across two or more first-level non-blocking TLBs in the multiprocessor system.

In some embodiments, the system determines a predicted page size using one or more of the following: the sizes of pages previously loaded by a program; program counter values of memory operations; information associated with the program that specifies the page sizes used (or preferred) by the program; and/or information associated with a processor that specifies the page sizes used (or preferred) by the program.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Non-Blocking TLBs

High instruction throughput for a processor typically requires the rapid translation of virtual addresses. Hence, the processor may include a number of specialized hardware structures that manage and speed up such address translations. This specialized translation hardware typically includes a translation lookaside buffer (TLB), which caches page table translation information. Earlier processor designs that include "blocking" TLBs cause the processor to wait until a valid entry is loaded ("filled") into the TLB after a "miss" (e.g., when the translation data needed to translate a virtual address is not available in the TLB). Recent speculative processors include "non-blocking" TLBs that allow multiple TLB miss requests to be sent out and handled in parallel.

Figure 1:
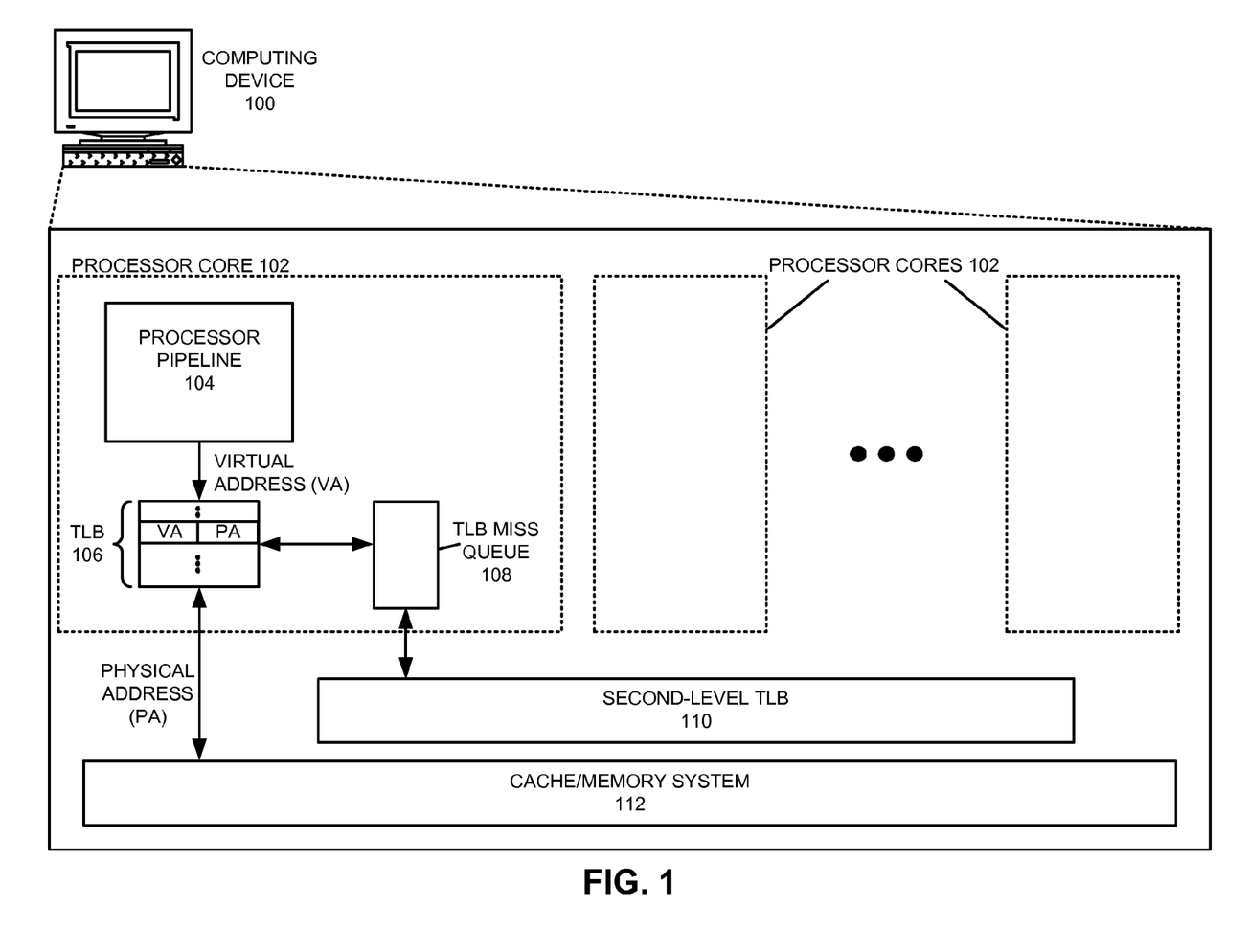
FIG. 1 illustrates an exemplary computing device that includes a set of structures for translating memory addresses in accordance with an embodiment.

FIG. 1 illustrates an exemplary computing device 100 that includes a set of structures for translating memory addresses. Computing device 100 can include one or more processor cores 102, each of which includes a processor pipeline 104 and TLB 106. The instructions executed in processor pipeline 104 access virtual addresses (VAs). If TLB 106 contains the translation information needed for a given virtual address, that virtual address is translated into a physical address (PA), and this physical address is sent to a cache and/or memory system 112 along with a corresponding load or store request. In the case of a TLB miss, however, this translation information needs to be loaded into TLB 106. TLB 106 sends a request to second-level TLB 110, and tracks this request using a TLB miss queue 108. After second-level TLB 110 returns the needed translation information, the request is removed from TLB miss queue 108, the translation information is loaded into TLB 106, the virtual address is translated, and normal execution resumes.

For a processor that includes a non-blocking TLB and uses fixed-size memory pages, the translation hardware can definitively determine whether a subsequent TLB miss requires a second request to second-level TLB 110 or will be handled by an existing request that was already sent (for an initial virtual address) and is being tracked in the TLB miss queue 108. For instance, in a processor with a fixed page size, upon encountering a second TLB miss for a second virtual address, the translation hardware can analyze the two virtual addresses to determine whether the second virtual address is in the same page as the initial virtual address being tracked in TLB miss queue 108. If the virtual addresses associated with two TLB misses map to the same memory page, no additional request needs to be sent to second-level TLB 110 for the second virtual address. Otherwise, if the two misses map to different memory pages, a second request is sent to second-level TLB 110 to load the translation information needed for the second miss.

However, determining whether a subsequent miss request should be sent to a second-level TLB in a modern processor architecture that supports the simultaneous use of multiple page sizes can be problematic. More specifically, in a processor that supports variable page sizes, the system may not know the page size associated with a TLB miss request until the time the request is filled, and hence may not be able to determine whether subsequent miss requests are in the same page as preceding outstanding miss requests.

For instance, consider a processor that supports memory pages with three pre-determined sizes (e.g., 8 KB, 4 MB, and 2 GB page sizes). If the system determines that the virtual addresses associated with a first TLB miss request and a subsequent second TLB miss are located within the granularity of a single smallest-size page, a second miss request is not needed; the TLB fill returned for the miss request (regardless of the associated page size) will also provide the translation needed for the second virtual address. However, when the second virtual memory address is located in a different small page from the first memory address (e.g., both would be in different pages if pages of the smallest size, 8 KB, were returned), but within the same larger-size page as the first memory address (e.g., the translation information for the second miss would be included in the first miss' TLB fill if a 4 MB or 2 GB page size were returned), the system typically cannot determine whether the second virtual address can be translated by the TLB fill of the initial request until that TLB fill has been received.

Waiting for a first TLB fill to return prior to issuing a second request injects additional latency into the address translation of the second virtual address (e.g., in the case that the first TLB fill did not include the necessary information for the second virtual address), and negatively impacts processor performance. Hence, most TLBs issue a second TLB miss request for the second miss to avoid a performance penalty. However, submitting multiple requests may result in multiple TLB fills that refer to the same page (if a large page size is returned), which can also lead to performance penalties. For instance, filling multiple entries of a fully associative TLB design with the same translation (e.g., translations that refer to the same page) can cause costly multi-hit traps or pipe clears combined with TLB invalidations. TLBs are typically implemented using content-addressable-memory structures (CAMs), and hence, when multiple hits are received from the CAM in response to a look-up request, it is not clear whether the multiple hits are due to the presence of duplicate entries or an error condition (e.g., an alpha particle may have flipped a bit for one of the translations, thereby resulting in an erroneous match). Because the system cannot guarantee that no error condition is present, the TLB cannot immediately supply a translation for the request, and instead may need to invoke additional special handling techniques. For instance, the translation system may invalidate the entries associated with the multiple hits and send another translation request. Alternatively, the translation system may trigger a software trap, thereby invoking a software exception handler to resolve the issue. Such operations may be complex, and may require additional logic comparators (which can impact the average cycle times of the processor) or involve other negative performance effects. Note also that, in general, filling entries in a TLB with duplicate information is a waste of expensive, high-speed TLB hardware.

Duplicate TLB fills have not been a substantial problem historically, because the speculative capabilities of processors have been fairly limited (e.g., few processors have been able to speculate so far ahead of a TLB miss that they touch subsequent memory pages). However, as processors become increasingly speculative (e.g., able to execute 500-1000 or more instructions ahead), the likelihood of triggering additional TLB misses (and hence duplicate fills) increases substantially (even if memory is accessed using a fairly linear access pattern).

Embodiments of the present invention extend the secondary miss logic for a translation system to avoid multi-hits.
Preventing Duplicate Entries and Multi-Hits for Non-Blocking TLBs Embodiments of the present invention perform a check when receiving a translation fill to determine if other outstanding TLB misses can be satisfied by the same fill. If other misses can be satisfied by the same fill, the translation system invalidates the duplicate miss requests, thereby preventing duplicate entries and multi-hits in the TLB.

Figure 2A:
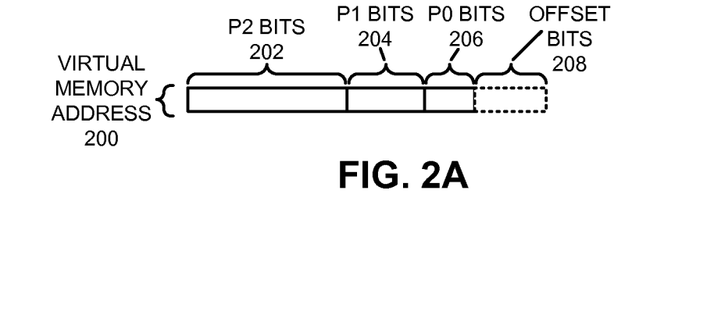
FIG. 2A illustrates a virtual memory address in the context of a virtual memory system with multiple page sizes in accordance with an embodiment.

FIG. 2A illustrates a virtual memory address 200 in the context of a virtual memory system with multiple (in the illustrated example, three) page sizes. The set of bits of virtual memory address 200 that are used as a virtual page index and an offset into the virtual page depends on the size of page. For instance, for the smallest size page, the system uses all of the P2, P1, and P0 bits (202-206) as a page index, and uses offset bits 208 as an offset into the page. For the largest size pages, only the P2 bits 202 are used as a page index, and the P1, P0, and offset bits (204-208) are all used as the offset into the large page.

Figure 2B:
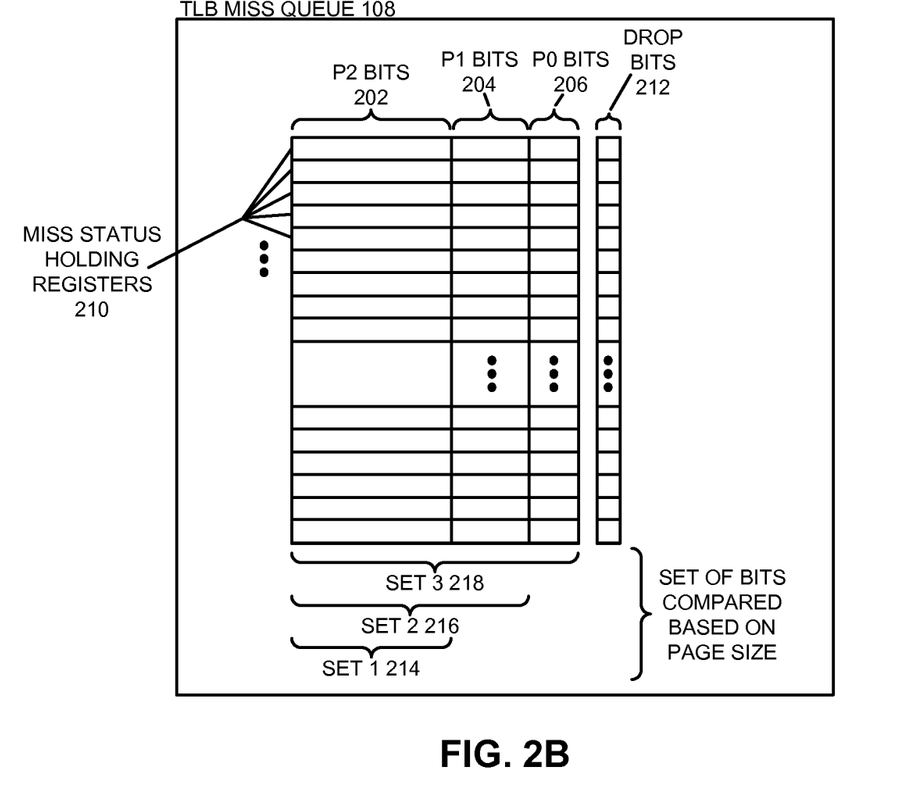
FIG. 2B illustrates an exemplary TLB miss queue in accordance with an embodiment.

FIG. 2B illustrates an exemplary TLB miss queue 108. TLB miss queue 108 includes a set of miss status holding registers (MSHRs) 210 that store portions of the virtual address associated with each pending TLB miss request. In embodiments of the present invention, whenever a translation fill is returned TLB miss queue 108 uses the virtual address and page size associated with the translation fill to check whether any other outstanding miss requests tracked in the miss status holding registers 210 are satisfied by the same translation fill. If so, TLB miss queue 108 invalidates such matching outstanding miss requests.

In some embodiments, TLB miss queue 108 includes drop bits 212 that are associated with each MSHR 210. Note that, even though MSHRs 210 are invalidated (e.g., marked as "dropped") because they have been satisfied by an earlier TLB fill, a miss request has already been sent, and unless some technique exists to halt pending requests, another TLB fill will eventually be received from a second-level TLB (or other fill mechanism). To ensure consistency and avoid errors, the translation system may continue to track the miss request in an MSHR 210 until its associated TLB fill has been received, even though that TLB fill will not be used because of the invalidation. For instance, the translation system may use a drop bit 212 to indicate that an outstanding miss request has been invalidated, but then continue to track the associated outstanding miss request until a response is received from a second-level TLB or other fill mechanism. In some embodiments, when receiving a TLB fill, the translation system may be configured to check the drop bit 212 of the associated MSHR 210 to determine whether the translation information should still be loaded into the TLB, or "dropped" (not filled in the TLB).

Note that, as described in the previous section, successive TLB misses that would hit in the same page (assuming the smallest size page) as an outstanding miss request do not need an additional miss request and entry in TLB miss queue 108. However, if the virtual address for a subsequent TLB miss is located beyond the granularity of the smallest size page from another miss request, but within the granularity of a larger page size, the system typically cannot determine whether that virtual address can be translated by another miss request in TLB miss queue 108, and hence needs to issue and track another miss request. The number of entries needed in TLB miss queue 108 may depend on a number of factors, including the page sizes and level of speculation supported by a processor.

Figure 2C:
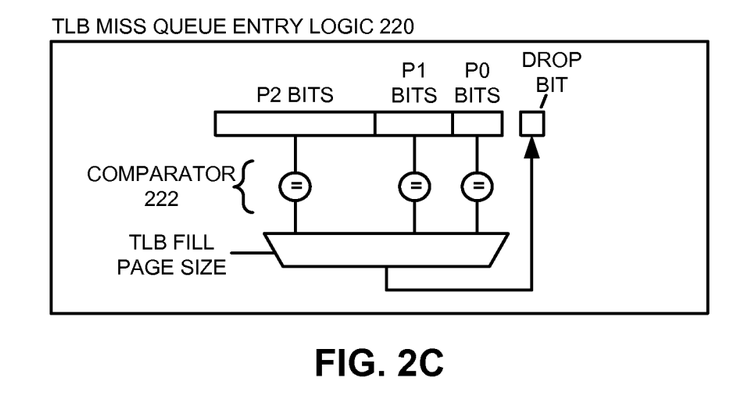
FIG. 2C illustrates the entry logic associated with an entry in a TLB miss queue in accordance with an embodiment.

FIG. 2C illustrates the entry logic 220 associated with an entry in TLB miss queue 108. When TLB miss queue 108 receives a TLB fill, comparator 222 in entry logic 220 compares the bits associated with the TLB fill with the bits stored in the MSHR 210 to determine whether the drop bit for the MSHR entry should be set. The translation system determines the set of bits (e.g., Set 1, Set 2, or Set 3 214-218, as illustrated in FIG. 2B) in the MSHR entry to compare based on the page size of the TLB fill.

Figure 2D:
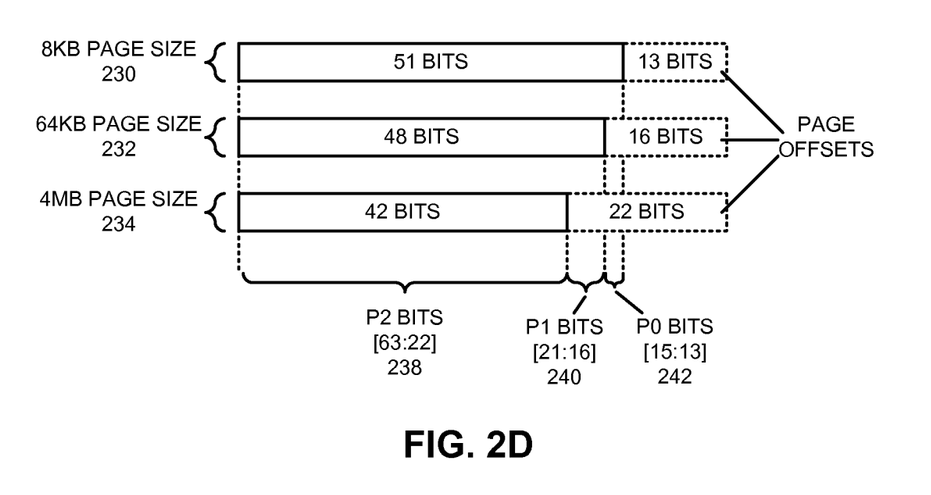
FIG. 2D illustrates the sets of bits in an MSHR entry that are compared with the address bits for a TLB fill for an exemplary computing device in accordance with an embodiment.

FIG. 2D illustrates the sets of bits in an MSHR entry that are compared with the address bits for a TLB fill for an exemplary computing device that supports 64-bit addressing and page sizes of 8 KB 230, 64 KB 232, and 4 MB 234. If a 4 MB page size 234 is returned from the next level of the translation hierarchy, only the P2 bits 238 (the top 42 bits, bits [63:22]) are compared with the address associated with the TLB fill, and the remaining 22 bits of the address serve as a page offset. For a 64 KB page size 232, the translation system compares the top 48 bits in the MSHR (e.g., both the P2 bits 238 and the P1 bits 240, which are bits [21:16]) with the address for the TLB fill. Finally, for the 8 KB page size 230, the translation system compares the top 51 bits in the MSHR (e.g., the P2 bits 238, the P1 bits 240, and the P0 bits 242, which are bits [15:13]) with the address for the TLB fill. If a match is found for the set of bits being compared for a given page size, the corresponding entry in the MSHR is marked as dropped.

Figure 3:
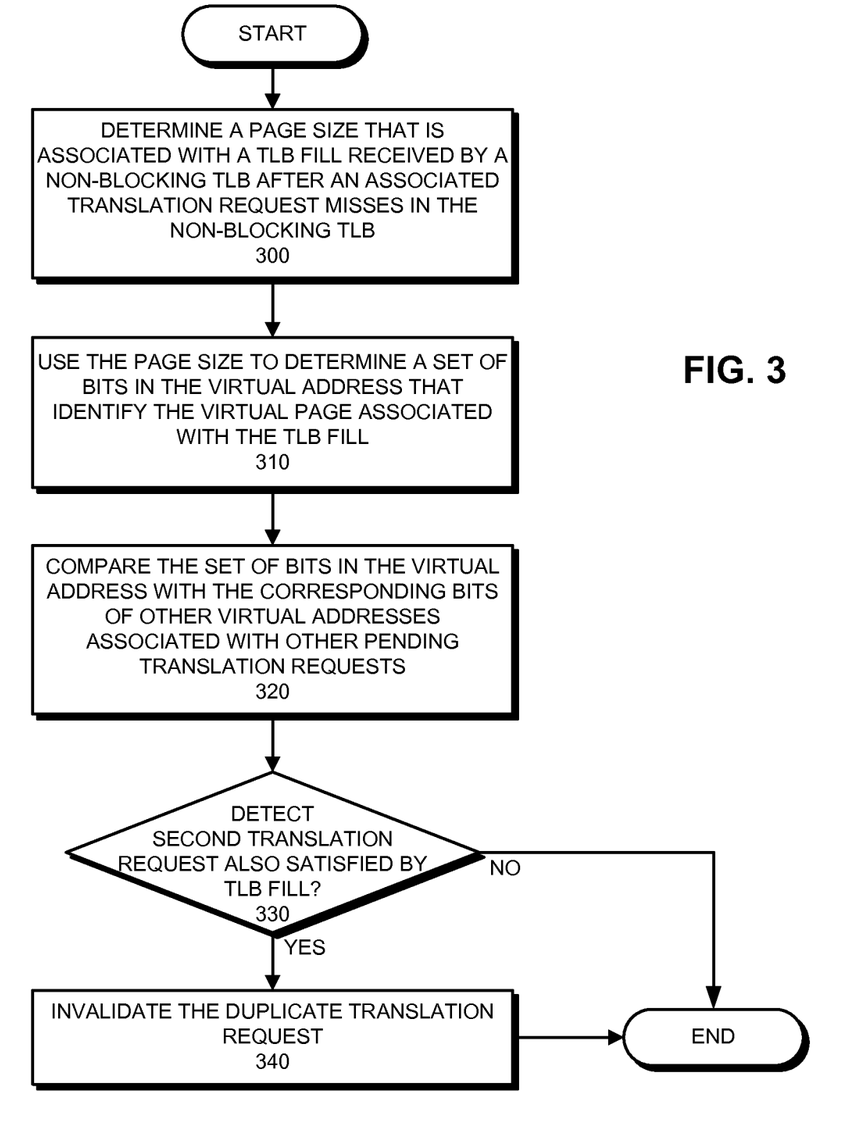
FIG. 3 presents a flow chart that illustrates the process of preventing duplicate entries in a translation system that includes a non-blocking TLB that supports multiple page sizes and speculative execution in accordance with an embodiment.

FIG. 3 presents a flow chart that illustrates the process of preventing duplicate entries in a translation system that includes a non-blocking TLB that supports multiple page sizes and speculative execution. During a translation request for a virtual address, the translation system determines a page size that is associated with a TLB fill received for the non-blocking TLB after an associated translation request misses in the non-blocking TLB (operation 300). The translation system uses the page size to determine a set of bits in the virtual address that identify the virtual page associated with the TLB fill (operation 310). The translation system then compares the set of bits in the virtual address with the corresponding bits of other virtual addresses associated with other pending translation requests (operation 320). If the translation system detects (operation 330) that a second virtual address that is associated with a second translation request is also satisfied by the TLB fill, the translation system invalidates the duplicate translation request associated with the second virtual address (operation 340); otherwise, the process ends.

Note that the translation request and the second translation request may or may not be temporally contiguous. The attempted translations for the first virtual address and the second virtual address may be separated by one or more instructions, and hence there may be one or more other translation requests that occur between the translation request and the second translation request. In some systems, the second translation request may even have been sent prior to the translation request receiving the TLB fill (e.g., TLB fills may be returned in an order different from the order in which their translation requests are issued). Note also that two or more translation requests may be satisfied by the same TLB fill. For instance, if a TLB fill is associated with a large-size page, and the address range for the large-size page spans multiple entries in the MSHRs, the TLB miss queue may invalidate all of the matching multiple entries that are satisfied by the TLB fill.

While the preceding examples illustrate a processor with three possible page sizes, the described techniques can be extrapolated to any processor that supports multiple page sizes. Note also that some alternate embodiments may not use drop bits 212, and may instead remove invalidated miss requests from MSHRs 210 at the time any TLB fill that satisfies their request is received.

In some embodiments, a TLB miss queue may include separate comparator hardware for each entry, so that the information in the TLB fill can be compared with all of the entries in MSHRs in parallel. In other embodiments, such comparisons may instead be performed in software, or using a mix of hardware and software. To enable software comparisons, the translation system may include mechanisms that facilitate software addressing of the MSHRs. For instance, the MSHRs may be configured to be viewed as an addressable buffer from a software viewpoint, thereby allowing software instructions to, upon a TLB fill: 1) load from such addresses; 2) perform the necessary comparisons with all of the active MSHR entries; and then 3) determine whether a given TLB fill should be entered into the TLB.

In some embodiments, the translation system includes a multi-level TLB. For instance, a chip multiprocessor (CMP) that includes multiple processor cores may include a private first-level TLB in each processor core, all of which share as a fill mechanism a larger second-level TLB. Miss requests from the first-level TLBs are sent to the second-level TLB, which returns TLB fill and page size information (as described above). Note that the described TLB organization and fill mechanisms are not limited to only this specific arrangement. For instance, some translation systems may include: additional hierarchical levels of TLBs; first-level TLBs that are shared among two or more processor cores; two or more second-level TLBs that each cover a subset of processor cores (with first-level TLBs); and/or a single-level TLB that operates in conjunction with a fill mechanism that is not a second-level TLB. Note also that the system may be spread across multiple chips; for instance, a second-level TLB may be a separate chip serving multiple processors or chip multiprocessors. A fill mechanism may also use a range of techniques and/or representations to either directly or indirectly indicate the page size of a TLB fill. For instance, because the set of page size options are often fixed for a given processor architecture or processor, a TLB fill mechanism may indicate the page size using a compact encoding that distinguishes the small set of different page sizes.

In some embodiments, the described techniques are more commonly used during "data misses" (e.g., translation misses that occur when accessing memory addresses specified in load or store instructions), when a speculative processor speculatively executes beyond a given data miss to access other addresses further ahead in the instruction stream. However, a TLB miss may also occur when executing an instruction at an address for which translation information has not yet been loaded in the TLB. Such "instruction misses" typically indicate that the next set of instructions are not available, and hence may be a barrier to additional speculative execution. However, in some scenarios instruction misses may also benefit from the described techniques. For instance, processors capable of speculating beyond an instruction TLB miss may generate further instruction TLB misses for a single large-size page, thereby leading to the possibility of duplicate entries and a need for the described techniques. For example, consider a case where an instruction fetch unit incorrectly predicts the target of a branch to a first given address X, which misses in the first-level non-blocking TLB. Before the translation request for address X returns, the mispredict is detected, and a new translation request is sent out for a second address Y. Address Y may be on a different small-size (e.g., 8 KB) page than address X, and hence not be dropped for being a secondary miss for the same page (e.g., the miss for address Y triggers a second translation request by the non-blocking TLB). The TLB fill for address X may return a larger (e.g., 4 MB) translation that covers both addresses X and Y, in which case the described techniques would be applicable and beneficial.

Reducing Fill Traffic by Predicting Page Sizes

As described previously, techniques for resolving duplicate TLB entries and multi-hit events often require translation requests to be resent, and can involve substantial latency and other negative performance effects. By preventing duplicate entries and multi-hit events, the described techniques reduce the bandwidth pressure on the fill mechanism (e.g., a second-level TLB) that supplies TLB fills in response to translation requests. However, while the previously described techniques prevent installing duplicate entries in the first-level TLB, the duplicate translation requests still consume bandwidth in the next-level fill mechanism. More specifically, although a second translation request may be invalidated in the first-level TLB, this invalidation typically only occurs after the second request has already been sent to the next-level fill mechanism. While additional mechanisms that cancel issued translation requests could be added to a processor, such mechanisms may involve substantial additional hardware and complexity, and may negatively impact the average cycle time of a processor. Hence, the next-level fill mechanism may perform multiple, duplicate operations for the same page.

Some embodiments of the present invention predict the page sizes for translation requests to reduce unnecessary request traffic to a next-level fill mechanism. When accurately predicting a large page size, the system can avoid sending out additional translation requests for that page. Similarly, when correctly predicting a small page size, the system can determine that a virtual address located beyond the bounds of an existing small page is a valid secondary miss, and generate an additional translation request.

Note, however, that while correctly predicting page sizes can improve the performance of the next-level fill mechanism by reducing waste traffic, mispredictions may incur additional translation latency. For instance, while mispredicting toward a small page size primarily generates waste traffic, mispredicting a large page size prevents a valid second translation request from being issued. To detect and resolve such an error, the system would need to record the dropped translation request, determine that a TLB fill being returned for another request does not have the predicted page size, and then issue an additional translation request to remedy the misprediction. However, because this additional translation is delayed (compared to in a non-predictive system), the eventual address translation takes longer to complete than in a non-predictive system. Hence, the translation system may be configured to predict conservatively (e.g., only act on predictive results that meet a specified level of certainty) to ensure that performance is not worsened due to mispredictions. The translation system may also adaptively react to a detected misprediction by clearing a tracked history of page size use (e.g., starting over with tracking), changing prediction parameters, and/or disabling the prediction mechanism.

In some embodiments a prediction mechanism may make predictions based on a number of inputs. For instance, the prediction mechanism may determine a predicted page size based on information associated with a program and/or processor. Such information may include heuristics, direct assertions made by the program and/or processor, and tracked context. For example, the prediction mechanism may track the history of page sizes loaded by a program and/or process, and upon determining a specified level of certainty that the process is accessing pages of a given size with a specified frequency, begin sending secondary translation miss requests based on that determined page granularity. The prediction mechanism may also predict based on the value in a processor's program counter (e.g., the instruction address of the specific instruction being executed) during memory operations. For instance, the prediction mechanism may maintain a table of program counter values and their corresponding page sizes (e.g., the page sizes that those specific instructions have accessed previously). The same program instruction is likely to access the same page size across different iterations, and hence in cases where similar loads are executed repeatedly (e.g., in the case of a "for" loop), the prediction system can perform a lookup on this table to read out a predicted page size for the instruction at a given value of the program counter. Note that the program counters stored in the table may be stored in a reduced form, for example by either storing just a subset of the program counter bits or by storing a smaller "hash" of the program counter bits. In this context, a hash of bits is a set of bits generated by performing a set of logic operations on the full set of program counters bits to reduce the number of bits that are stored for each program counter value (e.g., performing one or more logical xor operations to compact a section of the full program counter).

In summary, embodiments of the present invention extend the secondary miss logic for an address translation system that supports multiple page sizes and speculative execution. The described techniques perform a check when receiving a translation fill to determine if other outstanding TLB misses can be satisfied by the same fill. If so, the translation system invalidates the duplicate miss requests, thereby preventing duplicate entries and costly multi-hit events for the TLB.

Computing Environment

In some embodiments of the present invention, a non-blocking TLB structure that supports multiple page sizes and speculative execution and prevents duplicate entries can be incorporated into a wide range of computing devices in a computing environment.

Figure 4:
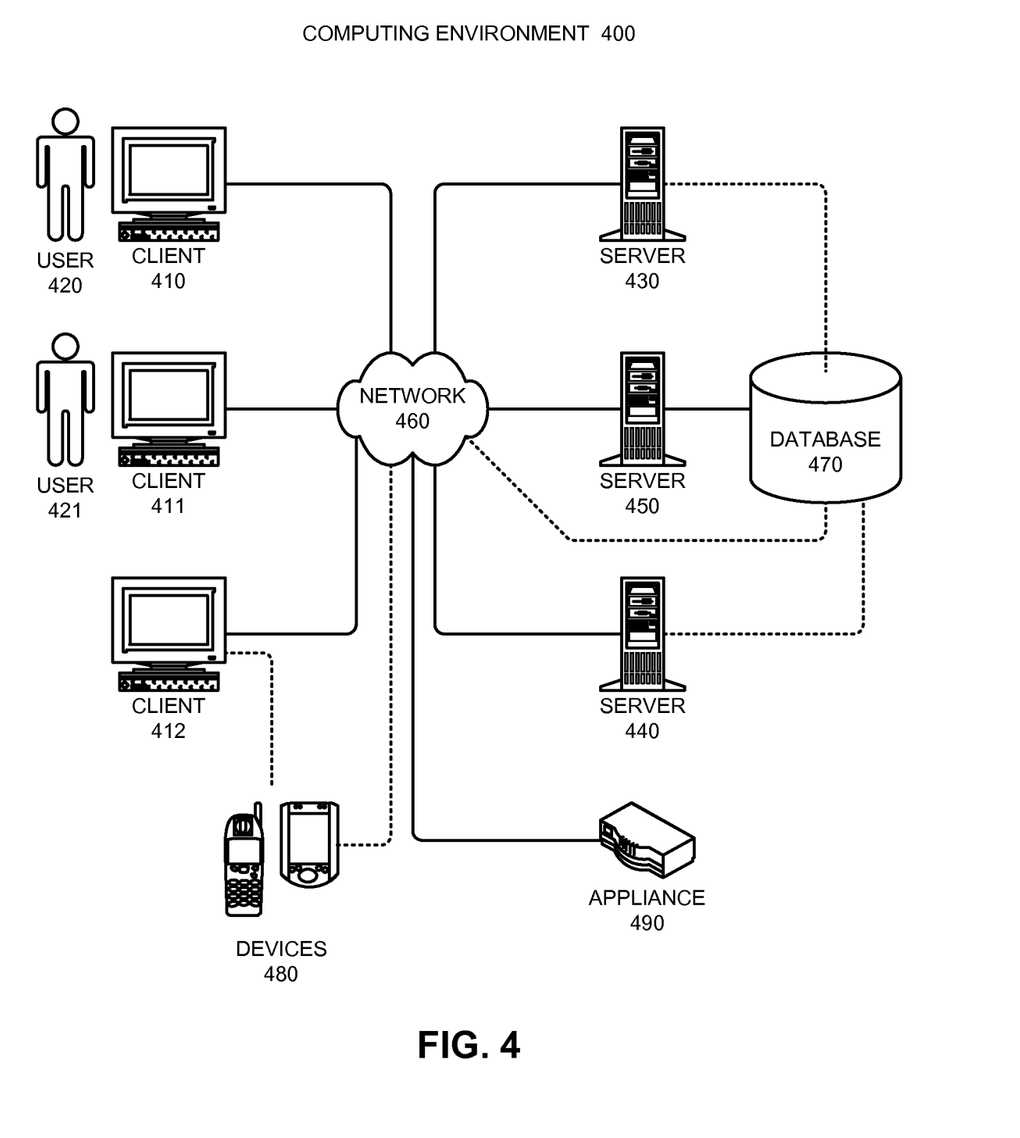
FIG. 4 illustrates a computing environment in accordance with an embodiment of the present invention.

FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, and appliance 490.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. In some embodiments of the present invention, database 470 is used to store information related to virtual machines and/or guest programs. Alternatively, other entities in computing environment 400 may also store such data (e.g., servers 430-450).

Devices 480 can include any type of electronic device that can be coupled to a client, such as client 412. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Note that different embodiments of the present invention may use different system configurations, and are not limited to the system configuration illustrated in computing environment 400. In general, any device that is capable of supporting virtual memory and/or the translation of virtual addresses to physical addresses may incorporate elements of the present invention.

Figure 5:
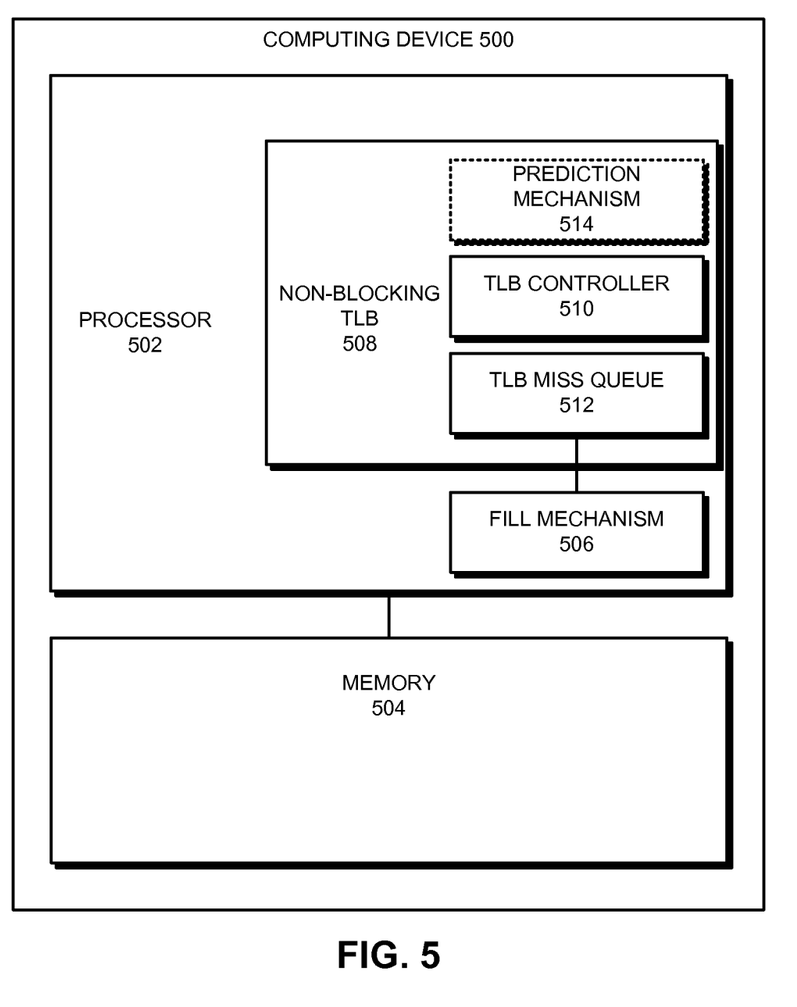
FIG. 5 illustrates a computing device that includes a processor with a non-blocking TLB structure that supports multiple page sizes and facilitates preventing duplicate entries in accordance with an embodiment.

FIG. 5 illustrates a computing device 500 that includes a processor with a non-blocking TLB structure that supports multiple page sizes and facilitates preventing duplicate entries. Computing device 500 includes processor 502 and memory 504. Processor 502 includes non-blocking TLB 508 and fill mechanism 506, which support multiple page sizes and speculative execution. Non-blocking TLB 508 includes a TLB controller 510 and a TLB miss queue 512 that are configured to prevent duplicate entries and multi-hits. In some embodiments, non-blocking TLB 508 may also include a prediction mechanism 514 that predicts the page sizes for translation requests to reduce unnecessary request traffic to fill mechanism 506.

During a translation request for a virtual address, TLB controller 510 determines a page size that is associated with a TLB fill received for non-blocking TLB 508 from fill mechanism 506. TLB controller 510 uses the page size to determine a set of bits in the virtual address that identify the virtual page associated with the TLB fill. TLB miss queue 512 then compares the set of bits in the virtual address with the corresponding bits of other virtual addresses associated with pending translation requests. If TLB miss queue 512 detects that a second virtual address that is associated with a second translation request is also satisfied by the TLB fill, TLB miss queue 512 invalidates the duplicate translation request associated with the second virtual address.

In some embodiments of the present invention, some or all aspects of non-blocking TLB 508, TLB controller 510, TLB miss queue 512, prediction mechanism 514, and/or fill mechanism 506 can be implemented as dedicated hardware modules in processor 502. For example, processor 502 can include one or more specialized circuits for performing the operations of the mechanisms. Alternatively, some or all of the operations of non-blocking TLB 508, TLB controller 510, TLB miss queue 512, prediction mechanism 514, and/or fill mechanism 506 may be performed using general-purpose circuits in processor 502 that are configured using processor instructions.

Although FIG. 5 illustrates non-blocking TLB 508, TLB controller 510, TLB miss queue 512, prediction mechanism 514, and/or fill mechanism 506 as being included in processor 502, in alternative embodiments some or all of these mechanisms are external to processor 502. For instance, these mechanisms may be incorporated into hardware modules external to processor 502. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for preventing duplicate entries in a non-blocking TLB that supports multiple page sizes, comprising:
    in response to determining a miss during a translation request for a virtual address, determining a page size associated with a TLB fill received for the non-blocking TLB for the translation request;
    using the page size to determine a set of bits in the virtual address that identify the virtual page associated with the TLB fill;
    detecting that a second virtual address associated with a second translation request that missed in the non-blocking TLB is also satisfied by the TLB fill by comparing the set of bits in the virtual address with corresponding bits of the second virtual address; and
    invalidating the duplicate translation request associated with the second virtual address.

2. The method of claim 1,
    wherein during speculative operation the non-blocking TLB tracks TLB fill requests for address translation misses using one or more miss status holding registers;
    wherein invalidating the duplicate translation request involves flagging a miss status holding register associated with the duplicate translation request; and
    wherein the method further involves discarding a subsequently received TLB fill that is associated with the flagged miss status holding register.

3. The method of claim 1, wherein the detecting that the second virtual address is also satisfied by the TLB fill occurs in response to a TLB miss queue receiving a translation fill for the translation request for the virtual address,
    wherein invaliding the duplicate translation request comprises invalidating an entry for the second translation request in the TLB miss queue, and
    wherein the method further comprises continuing to track the second translation request in the TLB miss queue by keeping the invalidated entry for the second translation request in the TLB miss queue until a TLB fill for the second translation request is received.

4. The method of claim 1, wherein preventing duplicate entries in the non-blocking TLB facilitates one or more of the following:
    reducing hardware overhead associated with resolving duplicate hits in the non-blocking TLB;
    reducing software overhead associated with resolving duplicate hits in the non-blocking TLB; and
    increasing the efficiency of the non-blocking TLB by increasing the number of unique page translations cached in the non-blocking TLB.

5. The method of claim 4, wherein increasing the efficiency of a first-level non-blocking TLB reduces bandwidth pressure on a next-level TLB supporting the first-level non-blocking TLB.

6. The method of claim 5, wherein the method further comprises:
    determining a predicted page size associated with the translation request for the virtual address;
    based on the predicted page size, predicting that the TLB fill for the virtual address is likely to provide a translation for the second virtual address; and
    preventing the first-level non-blocking TLB from sending a duplicate translation request to the next-level TLB for the second virtual address, thereby reducing the request traffic sent to the next-level TLB and reducing the latency of TLB fills.

7. The method of claim 6,
wherein the first-level non-blocking TLB is local to one or more processor cores in a multiprocessor system; and
wherein the next-level TLB is shared across two or more first-level non-blocking TLBs in the multiprocessor system.

8. The method of claim 6, wherein determining a predicted page size involves using one or more of the following:
the sizes of pages previously loaded by a program;
program counter values of memory operations;
information associated with the program that specifies the page sizes used by the program; and
information associated with a processor that specifies the page sizes used by the program.

9. A non-blocking TLB that prevents duplicate entries, wherein the non-blocking TLB supports multiple memory page sizes, wherein the size of the memory page is not known at the time a request is issued by the non-blocking TLB to a fill mechanism, comprising a TLB controller in the non-blocking TLB that is configured to:
in response to determining a miss during a translation request for a virtual address, determine a page size associated with a TLB fill received for the non-blocking TLB for the translation request;
use the page size to determine a set of bits in the virtual address that identify the virtual page associated with the TLB fill; and
detect that a second virtual address associated with a second translation request that missed in the non-blocking TLB is also satisfied by the TLB fill by comparing the set of bits in the virtual address with corresponding bits of the second virtual address; and
invalidate a duplicate translation request associated with the second virtual address.

10. The non-blocking TLB of claim 9,
wherein during speculative operation the non-blocking TLB tracks TLB fill requests for address translation misses using one or more miss status holding registers;
wherein invalidating the duplicate translation request involves flagging a miss status holding register associated with the duplicate translation request; and
wherein the TLB controller is configured to discard a subsequently received TLB fill that is associated with the flagged miss status holding register.

11. The non-blocking TLB of claim 9,
wherein preventing duplicate entries in the non-blocking TLB facilitates one or more of the following:
reducing hardware overhead associated with resolving duplicate hits in the non-blocking TLB;
reducing software overhead associated with resolving duplicate hits in the non-blocking TLB; and
increasing the efficiency of the non-blocking TLB by increasing the number of unique page translations cached in the non-blocking TLB.

12. The non-blocking TLB of claim 11, wherein increasing the efficiency of a first-level non-blocking TLB reduces bandwidth pressure on a next-level TLB supporting the first-level non-blocking TLB.

13. The non-blocking TLB of claim 12, wherein the non-blocking TLB further comprises a prediction mechanism configured to:
determine a predicted page size associated with the translation request for the virtual address;
based on the predicted page size, predict that the TLB fill for the virtual address is likely to provide a translation for the second virtual address; and
prevent the first-level non-blocking TLB from sending a duplicate translation request to the next-level TLB for the second virtual address, thereby reducing the request traffic sent to the next-level TLB and reducing the latency of TLB fills.

14. The non-blocking TLB of claim 13,
wherein the first-level non-blocking TLB is local to one or more processor cores in a multiprocessor system; and
wherein the next-level TLB is shared across two or more first-level non-blocking TLBs in the multiprocessor system.

15. The non-blocking TLB of claim 13, wherein the prediction mechanism is configured to determine the predicted page size using one or more of the following:
the sizes of pages previously loaded by a program;
program counter values of memory operations;
information associated with the program that specifies the page sizes used by the program; and
information associated with a processor that specifies the page sizes used by the program.

16. A processor that includes a non-blocking TLB that prevents duplicate entries, wherein the non-blocking TLB supports multiple memory page sizes, wherein the size of the memory page is not known at the time a request is issued by the non-blocking TLB to a fill mechanism, comprising a TLB controller in the non-blocking TLB that is configured to:
in response to determining a miss during a translation request for a virtual address, determine a page size associated with a TLB fill received for the non-blocking TLB for the translation request;
use the page size to determine a set of bits in the virtual address that identify the virtual page associated with the TLB fill; and
detect that a second virtual address associated with a second translation request that missed in the non-blocking TLB is also satisfied by the TLB fill by comparing the set of bits in the virtual address with corresponding bits of the second virtual address; and
invalidate a duplicate translation request associated with the second virtual address.

17. The processor of claim 16,
wherein during speculative operation the non-blocking TLB tracks TLB fill requests for address translation misses using one or more miss status holding registers;
wherein invalidating the duplicate translation request involves flagging a miss status holding register associated with the duplicate translation request; and
wherein the TLB controller is configured to discard a subsequently received TLB fill that is associated with the flagged miss status holding register.

18. The processor of claim 16, wherein preventing duplicate entries in the non-blocking TLB facilitates one or more of the following:
reducing hardware overhead associated with resolving duplicate hits in the non-blocking TLB;
reducing software overhead associated with resolving duplicate hits in the non-blocking TLB; and
increasing the efficiency of the non-blocking TLB by increasing the number of unique page translations cached in the non-blocking TLB.

19. The processor of claim 18,
wherein increasing the efficiency of a first-level non-blocking TLB reduces bandwidth pressure on a next-level TLB supporting the first-level non-blocking TLB.

20. The processor of claim 19, wherein the non-blocking TLB further comprises a prediction mechanism configured to:
- determine a predicted page size associated with the translation request for the virtual address;
- based on the predicted page size, predict that the TLB fill for the virtual address is likely to provide a translation for the second virtual address; and
- prevent the first-level non-blocking TLB from sending a duplicate translation request to the next-level TLB for the second virtual address, thereby reducing the request traffic sent to the next-level TLB and reducing the latency of TLB fills.

* * * * *

UNITED STATES PATENT AND TRADEMARK OFFICE
CERTIFICATE OF CORRECTION

| | | |
|---|---|---|
| PATENT NO. | : 8,635,428 B2 | Page 1 of 1 |
| APPLICATION NO. | : 12/633930 | |
| DATED | : January 21, 2014 | |
| INVENTOR(S) | : Martin R. Karlsson et al. | |

It is certified that error appears in the above-identified patent and that said Letters Patent is hereby corrected as shown below:

On the title page item (75), the second inventor's name should read: --Jian-Ming Chang--.
Please replace "Jing-Ming Chang" with --Jian-Ming Chang--.

Signed and Sealed this
Twenty-second Day of April, 2014

Michelle K. Lee
*Deputy Director of the United States Patent and Trademark Office*